US012630678B1

(12) United States Patent
Wagner et al.

(10) Patent No.: US 12,630,678 B1
(45) Date of Patent: May 19, 2026

(54) BIAXIALLY ORIENTATED FILM CONTAINING CYCLIC OLEFIN POLYMERS AND ALPHA-OLEFIN POLYMERS, METHOD FOR ITS PRODUCTION, AS WELL AS ITS USE IN A CAPACITOR

(71) Applicant: Brückner Maschinenbau Gmbh & Co. KG, Siegsdorf (DE)

(72) Inventors: Christina Wagner, Bad Reichenhall (DE); Roland Lund, Übersee (DE)

(73) Assignee: Brückner Maschinenbau GmbH & Co. KG, Siegsdorf (DE)

(*) Notice: Subject to any disclaimer, the term of this patent is extended or adjusted under 35 U.S.C. 154(b) by 741 days.

(21) Appl. No.: 17/976,106

(22) Filed: Oct. 28, 2022

(30) Foreign Application Priority Data

Oct. 29, 2021 (DE) ..................... 10 2021 128 332.9

(51) Int. Cl.
*C08J 5/18* (2006.01)

(52) U.S. Cl.
CPC ............. *C08J 5/18* (2013.01); *C08J 2323/08* (2013.01); *C08J 2323/12* (2013.01); *C08J 2400/12* (2013.01)

(58) Field of Classification Search
CPC .......... C08J 5/18; C08L 23/12; C08L 23/0823
See application file for complete search history.

(56) References Cited

U.S. PATENT DOCUMENTS

| | | | | |
|---|---|---|---|---|
| 5,724,222 A | | 3/1998 | Hirano et al. | |
| 6,017,616 A | * | 1/2000 | Kochem | C08G 61/08 156/244.11 |
| 6,068,936 A | * | 5/2000 | Peiffer | C08L 23/10 156/244.11 |
| 6,121,383 A | * | 9/2000 | Abdou-Sabet | C08L 23/12 525/216 |
| 6,461,724 B1 | * | 10/2002 | Radovanovic | B32B 27/32 428/315.9 |
| 2021/0147645 A1 | * | 5/2021 | Goerlitz | C08J 5/18 |
| 2023/0295404 A1 | | 9/2023 | Goerlitz | |

FOREIGN PATENT DOCUMENTS

| | | |
|---|---|---|
| CA | 2 115 196 | 8/1994 |
| CN | 1192455 | 9/1998 |
| CN | 110546190 | 12/2019 |
| CN | 110914939 | 3/2020 |
| DE | 195 36 043 | 4/1997 |
| DE | 102 42 730 | 3/2004 |
| DE | 102008051399 | 4/2010 |
| DE | 10 2010 034 643 | 2/2012 |
| DE | 10 2017 118 202 | 11/2018 |
| DE | 202020003627 | 1/2021 |
| EP | 0 992 531 | 4/2000 |
| EP | 2 481 767 | 8/2012 |
| JP | 5-262989 | 10/1993 |
| JP | 10081762 | 3/1998 |
| JP | 10204199 | 8/1998 |
| JP | 2017132841 | 8/2017 |
| JP | 2019202481 | 11/2019 |
| JP | 2020520127 | 7/2020 |
| JP | 2020521867 | 7/2020 |
| WO | 00/63013 | 10/2000 |
| WO | 2012022409 | 2/2012 |
| WO | 2015/007367 | 1/2015 |
| WO | 2015/091829 | 6/2015 |
| WO | 2018/197034 | 11/2018 |
| WO | 2018210854 | 11/2018 |

* cited by examiner

*Primary Examiner* — Robert C Boyle
(74) *Attorney, Agent, or Firm* — NIXON & VANDERHYE, PC

(57) ABSTRACT

Biaxially orientated film containing a) 1 to 25 percent by weight of at least 2 cyclic olefin polymers with a glass transition temperature in the range of 120 to 180° C. and b) 75 to 99 percent by weight of at least one semi-crystalline alpha-olefin polymer with a crystallite melting temperature in the range of 150 to 170° C., wherein the film contains at least a first cyclic olefin polymer and a second cyclic olefin polymer, wherein the second cyclic olefin polymer has a higher glass transition temperature than the first cyclic olefin polymer and wherein the weighted arithmetic mean of the glass transition temperatures of all the cyclic olefin polymers contained in the film is smaller than or equal to the weighted arithmetic mean of the crystallite melting temperature of all the semi-crystalline alpha-olefin polymers contained in the film.

19 Claims, 2 Drawing Sheets

BIAXIALLY ORIENTATED FILM CONTAINING CYCLIC OLEFIN POLYMERS AND ALPHA-OLEFIN POLYMERS, METHOD FOR ITS PRODUCTION, AS WELL AS ITS USE IN A CAPACITOR

This application claims priority to DE Patent Application No. 10 2021 128 332.9 filed Oct. 29, 2021, the entire contents of which is hereby incorporated by reference.

INTRODUCTION

Biaxially orientated film containing a) 1 to 25 percent by weight of at least 2 cyclic olefin polymers with a glass transition temperature in the range of 120 to 180° C. and b) 75 to 99 percent by weight of at least one semi-crystalline alpha-olefin polymer with a crystallite melting temperature in the range of 150 to 170° C., wherein the film contains at least a first cyclic olefin polymer and a second cyclic olefin polymer, wherein the second polymer has a higher glass transition temperature than the first cyclic olefin polymer and wherein the weighted arithmetic mean of the glass transition temperatures of all the cyclic olefin polymers contained in the film is smaller than or the same as the weighted arithmetic mean of the crystallite melting temperature of all of the semi-crystalline alpha-olefin polymers contained in the film.

PRIOR ART

Thermoplastic synthetic materials play a significant role in electrical engineering as insulators and dielectrics, in particular in the form of films. The use of alpha-polyolefins, and in particular of polypropylene (PP), is the most widespread. Patent documents WO 2015/091829 A1, U.S. Pat. No. 5,724,222 A and EP 2 481 767 A2 describe biaxially orientated polypropylene films to be used as dielectrics in capacitors. While polyethylene films are in general perfectly suited for use as dielectrics, they shrink considerably at high temperatures. This makes the films unsuited for use at high temperatures. In film capacitors, biaxially orientated polypropylene films are pre-dominantly used. This is justified in particular by the low dissipation factor and the high dielectric strength of polypropylene. Limitations arise, however, regarding its thermal stability (scope of 85 to 105° C.). At temperatures over 105° C. a voltage derating is necessary; the maximum permissible voltage must therefore be decreased. Use at temperatures over 115° C. is only possible with large limitations, otherwise not at all.

Cyclic olefin polymers have a significantly better dimensional stability under heat than usual polyolefins. The use of cyclic olefin polymers (COC) as capacitor films is known. These polymers have a high brittleness caused by their high glass transition temperatures, so that a biaxial stretching is only possible with difficulty if at all. Their use in capacitors is known from documents EP 0 992 531 A1, WO 00/63013 A2 and CA 2 115 196 C. Films made of cyclic olefin polymers can only be manufactured on machines produced especially for that purpose, and cannot withstand much stretching, which is inconvenient for the manufacture of thinner films, as are preferably used in capacitors.

In order to be able to use the temperature resistance of cyclic olefin polymers for application in capacitors, screens made of polypropylene and cyclic olefin polymers can be used. Screens made of polypropylene and cyclic olefin polymers are known from JP H05-262989, DE 10 2010 034 643 A1 and DE 195 36 043. In WO 2018/197034 A1 and DE 10 2017 118 202 A1, films for use in film capacitors are specifically described.

WO 2018/197034 A1 describes films with a content of 10 to 45 percent by weight of a cyclic olefin polymer with a glass transition temperature of 120 to 170° C. and one semi-crystalline alpha-olefin polymer (usually polypropylene) with a crystallite melting temperature in the range of 150 to 170° C., wherein the glass transition temperature of the cyclic olefin polymer is less than or equal to the crystallite melting temperature of the alpha-olefin polymer. The manufactured films have an advantageous surface roughness and a low heat shrinkage rate. In this context, if there is a high proportion of the cyclic olefin polymer in the specified quantity ranges, the properties of the cyclic olefin polymer emerge more strongly, that is to say, if there is a high proportion of the cyclic olefin polymer, the films have good thermal properties, including a low heat shrinkage; however, they are more brittle and therefore difficult to work with; in particular the maximum possible stretching ratio falls when manufacturing thinner films, which makes the manufacture of thinner films impossible at high stretching ratios. If you use high stretching ratios when there are high proportions of the cyclic olefin polymer, then the film tears easily and the necessary film lengths can no longer be manufactured. FIG. 3 illustrates this problem. Under otherwise identical conditions, the stretching ratio must be lowered, in particular in the longitudinal direction, in order to still get a workable film off a conventional conveyor belt when there are high proportions of cyclic olefin polymers. The points in FIG. 3 indicate the highest possible stretching ratio in the longitudinal direction with which a continuous production of a film is still possible, with the specified content of cyclic olefin polymers. On modern transport belts, films with a length of up to around 30,000 m are usually produced. If the films tear easily, then it is no longer possible to manufacture sheets of film of a defined length. This hinders commercial manufacturing of the films and their commercial use.

The same problems occur with using cyclic olefin polymers with a high glass transition temperature. When using a cyclic olefin polymer with a high glass transition temperature, the brittleness of the COC/PP blend increases significantly, so that a stable production of films by adapting the process parameters is only partially possible, or not at all. In general, there is a loss of running stability, that is, in the manufacture of films, there are increased instances of tearing during stretching, so that there is not a stable production. Necessary running lengths of up to 30,000 m cannot be produced.

According to WO 2018/197034 A1, films that can be used at temperatures of up to 120 to 125° C. in capacitors can be manufactured with adequate stretching ratios. For different applications, higher thermal stability and lower film thicknesses are, however, necessary, in particular for applications in capacitors for car manufacturing. In car manufacturing, electric circuits are frequently used in high-temperature environments, such as the engine compartment or near to batteries.

OBJECT OF THE INVENTION

It was the object of the present invention to manufacture films that have good electrical properties and a low shrinkage at high temperatures. High heat stability is desirable. The films should preferably be manufacturable in conventional facilities for the manufacture of biaxially orientated films. It is in particular important that they can be processed to form long sheets at high film speeds. It is further advantageous if the films can be manufactured with high stretching ratios. The manufacture of films with a low thickness is also sought after. Finally, it is a concern of this invention to make the manufacture of films, for example for capacitors, more commercially affordable.

DESCRIPTION OF THE INVENTION

The subject matter of the present invention is a biaxially orientated film containing a) at least 2 cyclic olefin polymers and b) at least one semi-crystalline alpha-olefin polymer, wherein the sum of the proportions of all cyclic olefin polymers in the film is in the range of 1 to 25 percent by weight and all cyclic olefin polymers contained in the film having a glass transition temperature in the range of 120 to 180° C. and the film containing at least a first cyclic olefin polymer and a second cyclic olefin polymer, wherein the second cyclic olefin polymer has a higher glass transition temperature than the first cyclic olefin polymer and wherein the sum of the proportions of all semi-crystalline alpha-olefin polymers in the film is in the range of 75 to 99 percent by weight and all semi-crystalline alpha-olefin polymers contained in the film having a crystallite melting temperature in the range of 150 to 170° C. and wherein the weighted arithmetic mean of the glass transition temperatures of all the cyclic olefin polymers contained in the film is smaller than or equal to the weighted arithmetic mean of the crystallite melting temperature of all the semi-crystalline alpha-olefin polymers contained in the film, and wherein all quantities are relative to the overall mass of the film. All the proportions of the percent in weight given in relation to this invention are in each case based on the overall mass of the film, provided nothing else is indicated.

The terms “orientate,” “elongate,” “stretch,” and “draw out” have the same meaning within the present description. This also applies to corresponding terms like “elongation,” “drawing,” “stretching” etc.

The films according to the invention have a surprising combination of good processability when being manufactured, high thermal stability and good electrical properties, which the films from the prior art do not offer to this extent. According to the prior art, the addition of a cyclic olefin polymer with a higher glass transition temperature lowers the processability of the film. As the present invention shows, this is, however, surprisingly not the case, or not the case to the same extent, if blends of cyclic olefin polymers are used, in which the cyclic olefin polymers have different glass transition temperatures.

The good processability is reflected in that the films according to the invention can be manufactured using an area stretching ratio of around 50. The area stretching ratio is the product of the stretching ratio in the longitudinal direction and the stretching ratio in the transverse direction. These high stretching ratios enable the manufacture of thin films with, for example, a thickness of less than 5 μm. Low film thicknesses are necessary in order to allow a high capacity in capacitors if volume is limited (installation space). At the same time, the films allow for manufacture with a film speed of 280 m/min after stretching, as well as during coiling (a typical film speed in the manufacture of films is 250 m/min). The films according to the invention are therefore commercially manufacturable.

At the same time, the films according to the invention can be used as dielectrics in capacitors up to temperatures of 135° C. and are thus also superior to films from the prior art in this way. They show significantly superior electric properties at these temperatures compared to films from the prior art. Film capacitors must, in particular in the automotive field, meet increased requirements regarding temperature and voltage. Re-quired operating temperatures are 125° C. and more, in particular 135° C. and more. A biaxially stretched film is provided by the invention, which meets the increased requirements. The present invention develops films that contain alpha-polyolefins and cyclic olefin polymers, hence a new, wide scope of application. The films also have low shrinkage values at high temperatures, in particular in the transverse direction (TD). Compared to the films known from WO 2018/197034 A1, thinner films thus result with more cost-effective manufacture and a possible application at higher temperatures. Further, the films according to the invention have good electrical properties and advantageous surface roughness.

A further effect of the present invention is that, due to the combination of two cyclic olefin polymers, a lower total quantity of cyclic olefin polymers can be used, and so with the same good thermal resistance, a better processability on the conveyor line can be attained. This has a positive effect on the attainable stretching ratio, in particular for sequential stretching. Furthermore, costs are saved by using lower quantities of cyclic olefin polymers. There is no negative influence on the electrical properties.

The high proportion of polypropylene in the present films ensures that the films are readily processable and in particular readily stretchable during manufacture. Surprisingly, the use of two cyclic olefin polymers with different glass transition temperatures provides for advantageous high temperature properties, without reducing processability.

The semi-crystalline alpha-olefin polymers used in the present invention are preferably polymers of C3 to C8 polyolefin. The side chains can be linear or branched. Generally, it is polypropylene. Polypropylene gives the films according to the invention good processability and good electrical properties. In particular, these are ordinarily propylene homopolymers. The polypropylene can, however, contain up to 10 percent by weight, and preferably up to 5 percent by weight, of one or several C4 to C8 polyolefins as comonomers. Preferably, the C4 to C8 polyolefins are selected from the group consisting of 1-butene, 1-hexene and 1-octene.

The semi-crystalline polyolefins can be linear or branched. Further, they can be statistical or block copolymers. They can, furthermore, be isotactic, syndiotactic or atactic polymers. Isotactic polypropylenes are preferred. The degree of crystallization typically ranges from 35% to 80% in polypropylenes, preferably from 60% to 80%. The degree of crystallisation is measured, according to ISO 11357, by differential scanning calorimetry (DSC), with a rate of heating of 10K/min. Isotactic polypropylenes with a degree of crystallisation in the range of 60% to 80% are especially preferred. Usually, polypropylenes with densities in the range of 0.895 g/$cm^3$ to 0.920 g/$cm^3$ are used. The density is measured according to ISO 1183.

The crystallite melting temperature is preferably in the range of 160 to 165° C. The modification of the crystallite melting temperature using copolymers is known to the person skilled in this art. The crystallite melting temperature is measured according to ISO 11357, by differential scanning calorimetry (DSC), with a rate of heating of 10K/min. The semi-crystalline alpha-olefin polymers used preferably have a melt flow index (melt flow rate, Tg) in the range of 1 to 4 g/10 minutes, measured at a temperature of 230° C. under a load of 2.16 kg. Unless otherwise indicated, all melt flow indexes of this description are measured according to ISO 1133.

In order to get advantageous electrical properties of the films, the films are preferably especially pure. For this, a high-purity quality is preferably chosen as the alpha-olefin polymer. It is especially preferred that the films according to the invention have a low metal content, as even traces of metals in the dielectric of a capacitor can detrimentally influence the electrical qualities of the capacitor. Preferably, the total content of iron, cobalt, nickel, titanium, molybdenum, vanadium, chromium, copper and aluminium in the film according to the invention is less than 0.25 ppm.

The commercially available polymers "Borclean® HC300BF", "Borclean® HC312BF", both manufactured by the company Borealis, polyolefins of the company "The Polyolefin Company" (TPC), Singapore and "Prime Polymer" are especially well-suited types of polymer.

The cyclic olefin polymers used in the present invention can be both homopolymers and copolymers. They can be manufactured by ring-opening or, in particular, by ring-conserving polymerisation. Preferably, they are manufactured by ring-conserving copolymerisation of cyclic olefins such as norbornene with non-cyclic olefins, like alpha-olefins or ethylene, wherein ethylene is preferred. Information about cyclic olefin polymers that can be used in the present invention can be found, for example, in WO 2018/197034 A1 and the documents cited in it. Cyclic olefin polymers can also be used, whose remaining double bonds have been hydrogenated after polymerisation.

Cyclic olefin polymers that can be manufactured by ring-conserving copolymerisation of at least one olefin of the formula (I) with at least one alpha-olefin of the formula (II) are preferred.

Formula I (I)

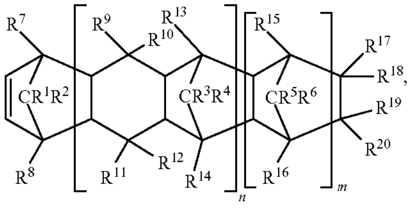

wherein n is 0 or 1, m is o or a positive whole number, preferably 0 or 1, $R^1$, $R^2$, $R^3$, $R^4$, $R^5$ and $R^6$ are chosen independently of one another from the group consisting of hydrogen, halogen, alkyl groups, cycloalkyl groups, aryl groups and alkoxy groups, $R^{17}$, $R^{18}$, $R^{19}$ and $R^{20}$ are selected independently of one another from the group consisting of hydrogen and alkyl groups, Wherein R17 and R19 can form a ring or a ring system together, wherein the rings can be saturated or unsaturated.

Formula (II)

(II)

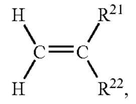

wherein $R^{21}$ and $R_{22}$ are selected independently of each other from the group consisting of hydrogen and alkyl groups.

Cyclic olefin polymers in which n is 0, m is 0 or 1, $R^{21}$ is hydrogen, and $R^{22}$ is chosen from the group consisting of hydrogen and a C1 to C8 alkyl group are preferred. Among these, such polymers as those in which $R^1$, $R^2$, $R^5$ to $R^8$ and $R^{15}$ to $R^{20}$ are also hydrogen are, in turn, preferred. Copolymers made of norbornene and ethylene and of tetracyclododecene and ethylene are most especially preferred.

A film according to the invention, wherein all the cyclic olefin polymers contained in it are copolymers that contain norbornene and ethylene as monomers, is most preferred. The polymerisation is preferably carried out in the presence of a metallocene catalyst.

The monomers of the formulas (I) and (II) are preferably used in a molar ratio of 95:5 to 5:95 to the cyclic olefin polymers of the film of the present invention. They can contain up to 10 mole percent, relative to the overall quantity of monomers, of one or several comonomers from the group consisting of propylene, pentene, hexene, cyclohexene and styrene.

Preferred cyclic olefin polymers can be taken from DE 102 42 730 A1. Especially preferred types of polymers are Topas® 6013, Topas® 6015, Topas® 6017 and Topas® 5013 by the company Topas Advanced Polymers GmbH, Frankfurt am Main, Germany, polymers from Mitsui Chemicals with the label "APEL COC" and polymers from the company JSR Corporation with the label "ARTON COC." Topas® 6013 M07/S04, TOPAS® 6015 S04 and TOPAS® 6017 S04 are most preferred. Polymers that can be manufactured by ring-opening polymerisation of cyclopentadiene or norbornene are also suitable.

The glass transition temperature of the cyclic olefin polymers are preferably in the range of from 120° C. to 170° C., particularly preferably in the range of from 130 to 170° C. and most preferably in the range of from 140 to 160° C. The glass transition temperature is measured according to ISO 11357 by DSC with a heating speed of 10 k/min.

Preferably, the cyclic olefin polymers have a melt flow index in the range of 0.3 and 4 g/10 minutes, measured at a temperature of 230° C. under a load of 2.16 kg.

For the use of the films according to the invention in capacitors, a low surface roughness is necessary. Too low a surface roughness leads, however, to poor processability of the film on the conveyor line. To create a sufficient but not excessive surface roughness, it is advantageous if the melt flow indices of the polymers used are matched to each other. Preferably, the ratio of the melt flow indices of cyclic olefin polymers to those of the semi-crystalline alpha-olefin polymers is in the range of 1:2 to 2:1.

The second cyclic olefin polymer is different from the first cyclic olefin polymer at least in that it has a higher glass transition temperature. Preferably, the glass transition temperature is at least 3°° C. higher, especially preferably at least 5° C. higher. Especially preferably, the glass transition temperature is at least 10° C. higher.

The use of several semi-crystalline alpha-olefin polymers is possible. This can serve to optimise the properties of the films. This is, however, not absolutely necessary for achieving the effects of the present invention. Through the use of several semi-crystalline alpha-olefin polymers, however, the manufacturing process of the films becomes somewhat more complicated. Films according to the invention, wherein the film only contains one semi-crystalline alpha-olefin polymer, and the weighted arithmetic mean of the glass transition temperatures of all the cyclic olefin polymers contained in the film being smaller than or equal to the crystallite melting temperature of the semi-crystalline alpha-olefin polymer, are therefore preferred. A film according to the invention that only contains one semi-crystalline alpha-olefin polymer, which is polypropylene, is especially preferred.

The film according to the invention must contain at least two cyclic olefin polymers. It can, however, also contain more than two cyclic olefin polymers, so for example 3 or 4. Of the cyclic olefin polymers, at least two must have a different glass transition temperature to one another. There can also be more than two cyclic olefin polymers included, so for example 3 or 4, that have differing glass transition temperatures to one another. Typically, however, the film according to the invention only contains one semi-crystalline alpha-olefin polymer, and no further cyclic olefin polymers besides the first and the second cyclic olefin polymers.

A film according to the invention is preferred, wherein the film only contains one semi-crystalline alpha-olefin polymer, which is polypropylene, and the film contains no further cyclic olefin polymers besides the first and the second cyclic olefin polymers, and both the first and also the second cyclic olefin polymer contain norbornene and ethylene as monomers. Such films are particularly suited for use in capacitors.

The biaxial orientation of the films according to the invention is significantly influenced by both the proportion of cyclic olefin polymers and also by the glass transition temperatures of the cyclic olefin polymers. The film according to the invention is especially suitable for capacitors, if the total of the percentages of all the cyclic olefin polymers in the film is in the range of 10 to 25 percent by weight and the total of the percentages of all semi-crystalline alpha-olefin polymers in the film is in the range of 75 to 90 percent by weight. Films are very particularly preferred, wherein the total of the percentages of all cyclic olefin polymers in the film is in the range of 10 to 20 percent by weight, and the total of the percentages of all semi-crystalline alpha-olefin polymers in the film is in the range of 80 to 90 percent by weight. The greatest preference is for films in which the total of the percentages of all the cyclic olefin polymers in the film is in the range of 15 to 20 percent by weight, and the total of the percentages of all the semi-crystalline alpha-olefin polymers in the film is in the range of 80 to 85 percent by weight. It is further preferred if the first and the second cyclic olefin polymer are each included at least in an amount of 3 percent by weight and especially preferred when these are included at least in an amount of 5 percent by weight.

Generally, the film according to the invention contains the first cyclic olefin polymer and the second cyclic olefin polymer, each in a percentage in the range of 3 to 22 percent by weight, preferably in the range of 3 to 17 percent by weight, especially preferably in the range of 5 to 15 percent by weight. If the cyclic olefin polymers are used in these amounts, then the effects that occur due to the use of more than one cyclic olefin polymer are especially pronounced.

Films can also contain, as well as the polymers described above, common excipients and additives. Usually, such things are added in amounts of no more than 5 percent by weight, preferably no more than 2 percent by weight. The excipients and additives can be chosen from the group consisting of fillers, pigments, dyes, oils, waxes, plasticisers, UV stabilisers, matting agents, preservatives, biocides, anti-oxidants, anti-static agents, fire retardants and reinforcing agents. Preferably, however, the films contain no further substances besides the polymers described above. In particular, it is preferred that the films contain no solids (besides the polymers described above) and in particular no anti-blocking agents and no fillers. Such solids can negatively influence electrical properties.

Preferably the films according to the invention have heat shrinkage in the longitudinal direction of at most 5%, especially preferably of at most 3%, and very especially preferably of at most 2%. Furthermore, the films according to the invention preferably have heat shrinkage in the transverse direction (TD) of at most 0.5%, especially preferably of at most 0.1%, and very especially preferably of at most 0.05%. The heat shrinkage in the transverse direction is crucial for use in capacitors, as such a heat shrinkage leads to the capacitor being damaged. In particular, the films should have this value of heat shrinkage in both directions at the same time. A film according to the invention is therefore in particular preferred, wherein the film has heat shrinkage in the longitudinal direction of at most 5%, and in the transverse direction of at most 0.5%. A film according to the invention is most preferred, wherein the film has heat shrinkage in the longitudinal direction of at most 2% and in the transverse direction of at most 0.5%. The heat shrinkage is in each case measured according to DIN ISO 11501, at 130° C. and for a period of 5 min. The most preferred are, however, films according to the invention that have such heat shrinkage in the transverse direction at a temperature of 140° C.

The roughness of the film plays a role in its electrical properties, and for this reason a low roughness is preferred. As, however, the films according to the invention usually do not contain anti-blocking agents, at least a certain surface roughness must be present, in order to ensure the processability of the film. Overly smooth films slip on transport rollers and can therefore not be practically processed in industrial facilities. A film is preferred that has a surface roughness Ra in the range of 0.02 to 0.2 μm, preferably of 0.04 to 0.12 μm. Ideally, the films according to the invention have a surface roughness Ra in the range of 0.06 to 0.09. The surface roughness Ra is determined according to DIN EN ISO 4287. As FIG. 1 shows, the films according to the invention have a homogeneous, fibrillar surface structure on both sides. When measuring the surface roughness Ra, a sensor head is run over a certain distance of the surface, in order to measure its un-evenness. As the projections of the surfaces of the films according to the invention are anisotropic, the measuring in the longitudinal direction of the film (the direction of transport) and in the direction perpendicular to that can pro-duce different results for surface roughness. It is preferred if both measured values are in the respective given ranges.

As is known to the person skilled in the art, the surface roughness of the film can be adjusted by suitable choice of the temperatures of the cooling roller and the preheated temperature for the stretching. In the case of simultaneous stretching, the temperatures of the cooling roller and the preheated temperature of the oven are aligned with each other for simultaneous stretching (for example in a LISIM machine). For sequential stretching, the temperatures of the cooling roller and the preheated temperature and the temperature of the drawing rollers of the longitudinal stretching device (MDO) are aligned with each other.

The film according to the invention preferably has a thickness in the range of 2 μm to 10 μm. Films according to the invention with a thickness in the range of 2 to 5 μm are especially preferred. In this context, these are film thicknesses as determined by DIN 53370. Films with such thicknesses are the best suited for application as dielectrics.

The width of the films according to the invention is typically in the range of 0.1 to 10 m and mostly in the range of 5 to 7 m.

A biaxially orientated film is preferred, containing a) at least a first cyclic olefin polymer and a second cyclic olefin polymer, wherein both contain 5 to 95 percent by weight of norbornene and 5 to 95 percent by weight of ethylene as monomers each, based on the whole cyclic olefin polymer and b) at least one semi-crystalline polypropylene, wherein the total of the percentages of all the cyclic olefin polymers in the film is in the range of 10 to 25 percent by weight and all the cyclic olefin polymers contained in the film having a glass transition temperature in the range of 120 to 180° C., wherein the second cyclic olefin polymer has a glass transition temperature at least 3° C. higher than the first cyclic olefin polymer, wherein the first cyclic olefin polymer and the second cyclic olefin polymer are contained in the film, each in a proportion in the range of 5 to 15 percent by weight, and wherein the total of the percentages of all the semi-crystalline polypropylenes in the film is in the range of 75 to 90 percent by weight and all the semi-crystalline alpha-olefin polymers contained in the film having a crystallite melting temperature in the range of 150 to 170° C. in the film, and wherein the weighted arithmetic mean of the glass transition temperatures of all the semi-crystalline polypropylenes contained in the film is less than or equal to the weighted arithmetic mean of the crystallite melting temperature of all of the semi-crystalline polypropylenes contained in the film, and wherein the film has a thickness in the range of 2 μm to 10 μm and unless otherwise indicated, all quantities are relative to the overall mass of the film.

The films according to the invention can have one or several layers and are therefore single-layer films or multi-layer films. In multi-layer films, at least one layer has the composition of the film according to the invention described above. There can also be several layers of such a multi-layer film made of a film according to the invention.

A further embodiment of the present invention is therefore a multi-layer film, comprising at least one layer that consists of a film according to the invention as herein described. In one embodiment, this is a multi-layer film that has a film according to the invention as one layer as described above, that has an outer layer either only on one side or on both sides, said outer layer containing one or several semi-crystalline alpha-olefin polymers, wherein semi-crystalline polypropylene, as it is described above, is preferred in particular. In this way, the multi-layer films preferably have the same properties, in particular concerning shrinkage and surface roughness, as the single-layered films. Coextruded multi-layer films with at least one polypropylene outer layer and at least one layer that has the composition of the film according to the invention, described above, have the advantage that their surface properties can be adjusted with known techniques that are standard for polypropylene capacitor films, e.g. through targeted control of the crystallisation and targeted formation of spherulites, and that if there is at least one layer of the film according to the invention, described above, mechanical and electrical properties of these multi-layer films can be improved at high temperatures.

Multi-layer films that comprise a middle layer that contains a semi-crystalline alpha-olefin polymer, as described above, and has two outer layers that are each formed of a film according to the invention as herein described, are especially preferred. It is most especially preferred that the middle layer thereby exclusively contains semi-crystalline polypropylene, as it is herein described. A film with improved thermal stability thus results from the outer layers, with very good dielectric properties, as 100% polypropylene in the middle layer significantly influences this. Such films, that have no further layers except the middle layer and the outer layers, are the most preferred. The film can, however, additionally have a metallisation, as explained in the following.

A further embodiment of the film according to the invention is a coated film. Here, this is a film in which at least one outer layer has been coated with a material. In this sense, coating is understood to mean that the coating was not created during the extrusion of the film. The coating can be applied to the finished film in a separate process after the manufacture of the film. A preferred embodiment is a film according to the invention that is coated with a conductive layer on at least one side. A further embodiment of the present invention is thus a film according to the invention, wherein the film is metallised on one or both sides.

Metallisation is necessary for use in film capacitors. A film coated with a metal later on one side is therefore the most preferred. To this end, the film surface can be activated by means of corona treatment after stretching and then a metal layer can be applied. Films according to the invention that are metallised on both sides are also part of the present invention.

A further object of the present invention is a capacitor, which is characterised in that it comprises a film as described in this description. The capacitors according to the invention preferably have an electrical dielectric strength of greater than or equal to 500V/μm when the film thickness is 3.8 μm, measured according to DIN EN 60243-2 with direct current voltage at 23° C., and an electrical dielectric strength of greater than or equal to 400V/μm when the film thickness is 2, 7 μm. Furthermore, the films and capacitors according to the invention preferably have a dielectric loss factor of less than or equal 1 to $2*10^{-4}$ measured at a frequency in the range of 1 kHz and of 1 GHz at a temperature of 25° C. The loss factor is determined according to DIN EN 60674-2 (VDE). Furthermore, it is preferred if the capacitor contains a film that has a dielectric constant in the range of 2 to 2.5. The dielectric constant is also determined according to DIN EN 60674-2 (VDE).

A further object of the present invention is a method for manufacturing a film according to the invention, comprising the following steps:

Production, in particular by means of extrusion, of a film containing at least two cyclic olefin polymers and at least one semi-crystalline alpha-olefin polymer, Stretching the film in the longitudinal direction (MD) and in the transverse direction (TD), in order to obtain a biaxially stretched film, and Coiling the biaxially stretched film.

The features and advantages mentioned for the film likewise apply to the method, and vice versa.

Preferably, the surface stretching ratio of the biaxially stretched film, in particular the coiled film, is at least 40.

The stretching can be done simultaneously in the longitudinal direction and in the transverse direction or the stretching can be done in the longitudinal direction initially, and the film that is stretched in the longitudinal direction can then be stretched in the transverse direction.

To improve the properties of the film, one or more of the following further steps can be done after the stretching and before the coiling:

Thermal treatment of the biaxially stretched film,

Relaxation of the biaxially stretched film, whereby the surface stretching ratio is deliberately reduced.

For example, the surface stretching ratio is at least 40 even after relaxation.

The method is described more precisely in the following:

(1) Formula & Dosage

The raw material for the manufacture of the films according to the invention can, as one possibility, be prepared as a compound that contains semi-crystalline alpha-olefin polymers and cyclic olefin polymers. Batch dosing can also be employed, wherein the semi-crystalline alpha-olefin polymers and cyclic olefin polymers are mixed together according to the formula directly before the extruder is loaded.

If the film has several layers, a separate raw material can be prepared for each layer. According to the desired thickness of each layer, the raw material for each layer is separately measured out.

What was said above for the film according to the invention applies for the alpha-olefin polymers and cyclic olefin polymers used in this method.

(2) Extrusion

The raw material or the raw materials are fed into an extruder. In the extruder they are mixed and melted. If the film only has one layer, only one extruder is needed.

If the film has several layers, generally a separate extruder is used for each layer. However, several layers can also be manufactured from the same plastic granulate, if two or more layers have the same composition. Then, the material for two or more of these layers can be extruded from the same extruder. Furthermore, all layers can be extruded from one extruder, if all layers have the same composition. Any kind of extruder can be used.

Preferably the extruder is or the extruders are chosen from the group consisting of single-screw extruders, cascade extruders, and twin-screw extruders.

Other mixing and processing aggregates, such as e.g. a buss kneader or a planetary roller extruder can also be used. The extruders are preferably run at a temperature in the range of 230 to 280° C., especially preferably at a temperature in the range of 240 to 270° C.

(3) Nozzle and Cooling Roll

The melt is discharged via a wide-slit nozzle and deposited on a cooling roll. If the film has several layers, a multilayer nozzle is preferably used.

Preferably, a device for laying the film onto the cooling roll (pinning system) is used in order to improve the application of the film to the cooling roll. A preferred device is an air curtain, so a directed airflow that exerts a force on the film in the direction of the cooling roll.

A pinning system leads to more even contact between the film and the cooling roll, and thus to the formation of a smooth and even cast film.

The temperature of the cooling roll is preferably in the range of 80 to 100° C., preferably from 85 to 95° C. and most preferably from 90 to 95° C. For setting the desired roughness, a higher temperature within the indicated temperature range is selected for thinner films. For a film thickness of 3.8 μm, as manufactured in the examples, the range from 90 to 95° C. is most suitable, in particular a temperature of 93° C.

(4) Stretching Out

The cast film manufactured in this way is subsequently stretched in the longitudinal direction (machine direction; MD) and in the transverse direction (TD).

In the method according to the invention, the stretching ratio in the longitudinal direction is, for example, in the range of 3.0 to 7.0, preferably in the range of 5.0 to 7.0.

In the method according to the invention, the stretching ratio in the transverse direction is preferably in the range of 7.0 to 13.0, preferably in the range of 8.0 to 11.0.

The biaxial orientation or stretching in the longitudinal direction and in the transverse direction can take place one after the other—in this case we speak of sequential stretching—or the film is simultaneously in the longitudinal and transverse direction—in this case we speak of simultaneous stretching.

(4.1) Sequential Stretching

Sequential stretching is preferably carried out as follows.

a) Stretching in the Longitudinal Direction

By way of example, the cast film manufactured as described above is first stretched in the longitudinal direction. For this, the cast film is fed into a longitudinal stretching machine—also called an MDO (machine direction orienter) —and, after sufficient heating, is stretched in the machine direction. The film is stretched in the longitudinal direction, for example between pairs of rollers with different rotation speeds.

Such a longitudinal stretching machine is, for example, dis-closed in DE102011109385A1.

b) Stretching in the Transverse Direction

The stretching in the transverse direction preferably occurs after stretching in the longitudinal direction. For stretching in the transverse direction, the film that has been stretched in the longitudinal direction is fed into a transverse stretching machine 10—called a TDO (transverse direction orienter).

Transverse stretching machines 10, as are schematically depicted in FIG. 1, usually have an oven 14 as well as two transport belts 16 for the film.

The transport belts 16 are positioned mirror-symmetrically with respect to an axis of symmetry S of the stretching machine 10 and extend at least partially into the oven 14. The transport belts 16 run outside the oven 14 in an infeed zone 18 as well as a discharge zone 20, in which the length of material 12 is fed into or discharged from the stretching machine 10.

As well as the infeed zone 18 and the discharge zone 20, the transverse stretching machine 10 has at least three further zones 22, 24, 26.

The zones 22, 24, 26 adjoin one another, so that—viewed along the longitudinal direction or the usual withdrawal direction R of the transverse stretching machine 10—the infeed zone 18 initially connects with the first zone 22, which then connects with the second zone 24, then the third zone 26, and finally the discharge zone 20.

In the first zone 22 of the transverse stretching machine 10, which adjoins the infeed zone 18, zone 22 also being called the preheating zone, the transport belts 16 are at a first distance from each other.

In the second zone 24, also called the stretching zone, the distance of the two transport belts 16 from each other increases, until finally at the start of the third zone 26, also called the heat treatment zone, a second distance is reached.

On each of the transport belts 16, a plurality of clip units 28 are guided in a known manner. The clip units 28 can be moved along the transport belt 16 by a suitable degree of pro-pulsion.

Such a transverse stretching machine 10 is known, for example, from WO2014094803A1.

For transverse stretching, the film that has already been stretched in the longitudinal direction is fed into the transverse stretching machine 10 in the infeed zone 18 of the stretching machine 10 in the withdrawal direction R. This occurs, for example, by the film being placed into the clip units 28 on the corresponding side of the transport belt 16 provided, with its longitudinal edges aligned with the withdrawal direction. This process is also called "clipping in." The clip units 28 thereby grip the film and move this into or through the oven 14 of the transverse stretching machine 10.

In the infeed zone 18, the film 12 has a width E perpendicular to the withdrawal direction R, which corresponds roughly to the first distance between the transport belts 16.

The film 12 is then fed through the first zone 22 and heated there.

In the following second zone 24, so the stretching zone, the film 12 is stretched in the transverse direction, as the distance of the transport belts 16 is continuously increasing. The film 12 thereby becomes thinner and wider. At the end of the second zone 24, the film 12 has a second width.

After the stretching is complete, the film 12 now goes through the third zone 26, in which a relaxation of the film 12 can occur, before the film 12 is detached from the clip units 28 in the discharge zone 20 and leaves the transverse stretching machine 10 with the width.

(4.2) Simultaneous Stretching

Simultaneous stretching is, for example, done as follows, preferably by means of a pantograph method, a screw method, a LISIM method or MESIM method. The film speed here is up to 250 m/min.

The construction of a simultaneous stretching machine corresponds to the previously described construction of the transverse stretching machine, in relation to the different zones and the essential positioning of the belts in the oven. Differences between a transverse stretching machine and a simultaneous stretching machine consist in the lengths of the zones and/or temperatures in the zones. Additionally, the transport system differs in that the clip units in simultaneous stretching machines can be individually accelerated on the belts, for example by means of linear motors, in order to stretch the film in the longitudinal direction. Such a simultaneous stretching machine is, for example, described in WO2015007367A1, in particular in paragraphs [0045] to [0055].

In simultaneous stretching, the unstretched cast film runs into the infeed zone of the simultaneous stretching machine and is there, as previously described, clipped into the clip units.

The film is then fed into the first zone and is heated there.

The film is then fed into the second zone, so the stretching zone, in order to be simultaneously stretched in the longitudinal and transverse direction.

Similarly to the transverse stretching machine described, the transverse stretching of the film occurs in that the distance of the transport belts to one another increases in the stretching zone, whereby the width of the film is increased.

In contrast to the transverse stretching machine, the clip units 28 are accelerated in the stretching zone to a higher speed, also called the stretching speed, compared with the driving speed in the infeed zone. The film is thus also stretched in the longitudinal direction.

In other words, the distancing of the clip units in the stretching zone increases, both in the longitudinal direction and also in the transverse direction, so that the film is simultaneously stretched in the longitudinal and in the transverse direction. The distances of the clip units are, in this way, increased in the longitudinal and transverse directions, in proportion to the desired stretching ratios.

The biaxially stretched film then runs through, as described for the transverse stretching device, a third zone, in which a heat treatment or relaxation of the film occurs. In doing this, the distance in the transverse direction of opposite clip units can be decreased. The speeds of the clip units can also be decreased from the stretching zone.

In the discharge zone, the film is unclipped by suitable means and then leaves the simultaneous stretching machine.

(5) Heat Treatment

Preferably, the film is subjected to a heat treatment (also called stabilisation or annealing) after stretching. For this, the film is held at a heightened temperature for a specific period of time. This preferably happens directly after the stretching in the third zone of the transverse stretching machine or the simultaneous stretching machine.

During the heat treatment, tensions inside the film, which developed due to the stretching, are reduced. Properties across the whole surface of the film are hereby standardised.

(6) Relaxation

Preferably, a relaxation of the film is carried out during the heat treatment. This means that the tension on the film is reduced, whereby the stretching ratio is deliberately reduced.

In sequential stretching, the film is only relaxed in the transverse direction, for example by lowering the distance between the transport belts in the third zone.

In simultaneous stretching, a relaxation occurs in particular both in the longitudinal and also in the transverse direction. For example, the distance in the transverse direction between opposite clip units is lowered and the speeds of the clip units are lowered to the extent of the desired relaxation, compared to the speeds in the stretching zone.

It is also advantageous if the scope of the relaxation in the method according to the invention is in the range of 2% and 15%, preferably in the range on 7 to 12%. During simultaneous stretching, this preferably applies for both directions. Due to the relaxation, the shrinkage of the film is reduced.

(7) Coiling

After the film has been biaxially stretched, the film is coiled.

To do this, the edge of the film that was gripped by the clip units is first cut off.

Where appropriate, the surface of the film can still be treated before the final coiling, if this is desired or necessary.

Finally, the film is coiled on a roller.

(8) Further Processing

The biaxially orientated film manufactured in this way according to the present invention can be further processed by further work steps.

For example, the film can be made into cut rolls before further processing.

Further possible processing steps are, among others, metallisation, lamination, covering, coating (barriers, protection), printing, surface treatment, laser processing, painting, etc. Preferably, the films are metallised.

A further subject of the present invention is the use of a film, in particular a metallised film, as described in this description, as a dielectric for the manufacture of capacitors.

LIST OF ABBREVIATIONS

BO biaxially orientated

BOPP biaxially orientated polypropylene

Figure 1:
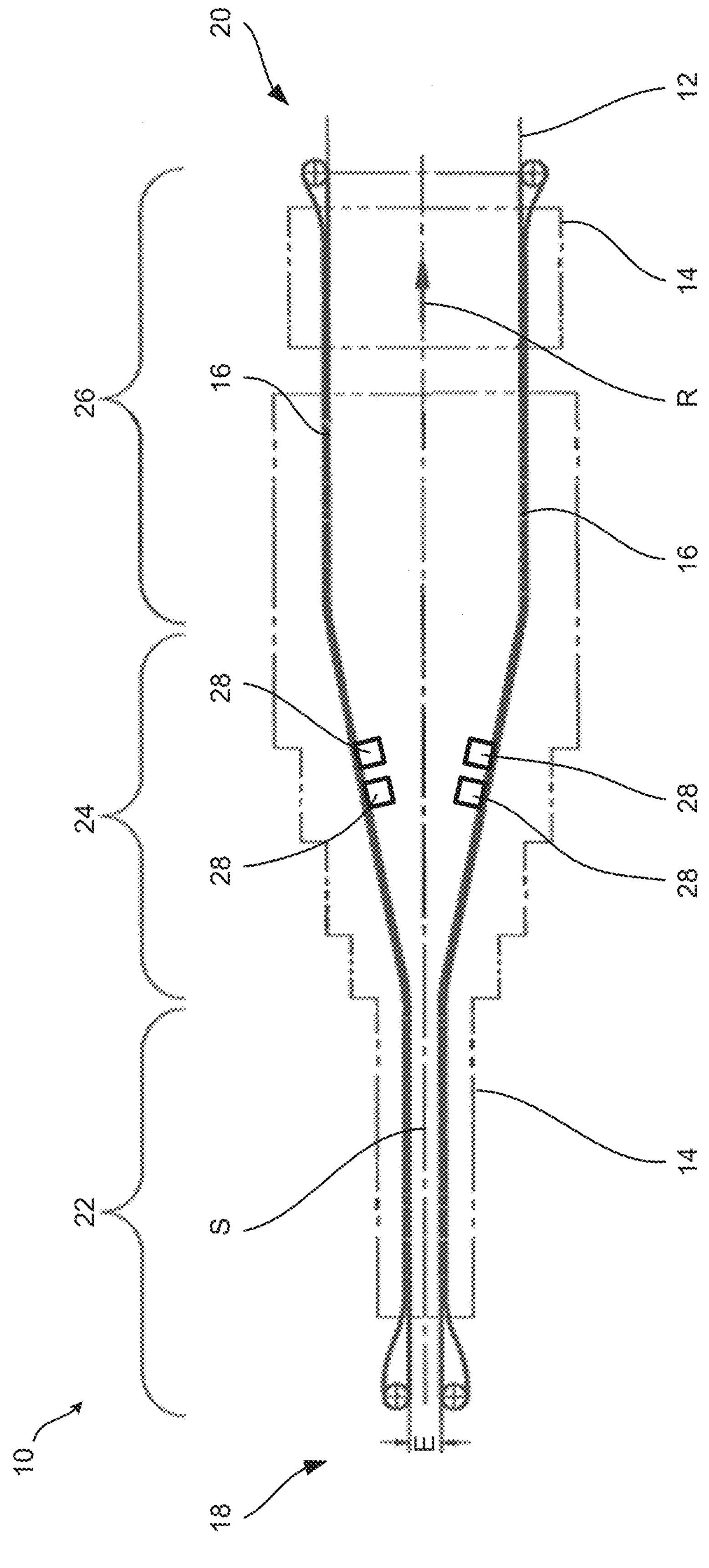
FIG. 1 schematically shows a transverse stretching machine.
Figure 2:
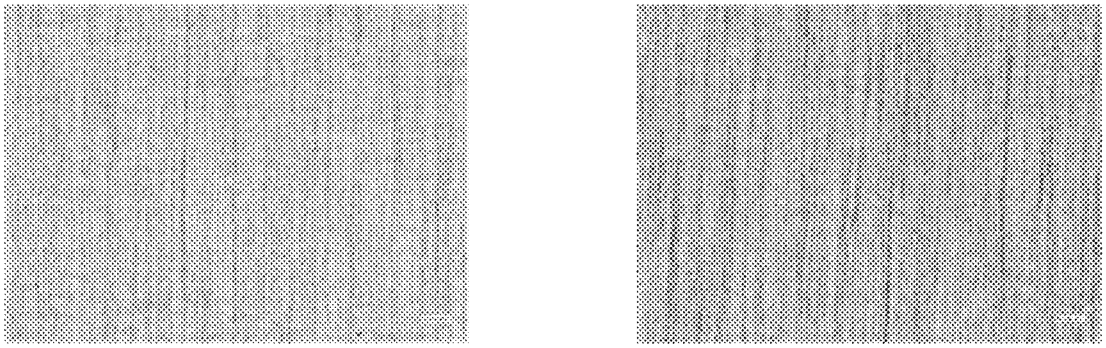
FIG. 2 shows a microscopic image of the surface of a film according to the invention on the left, which was facing the cooling roll during the manufacture, and the opposite side on the right.
Figure 3:
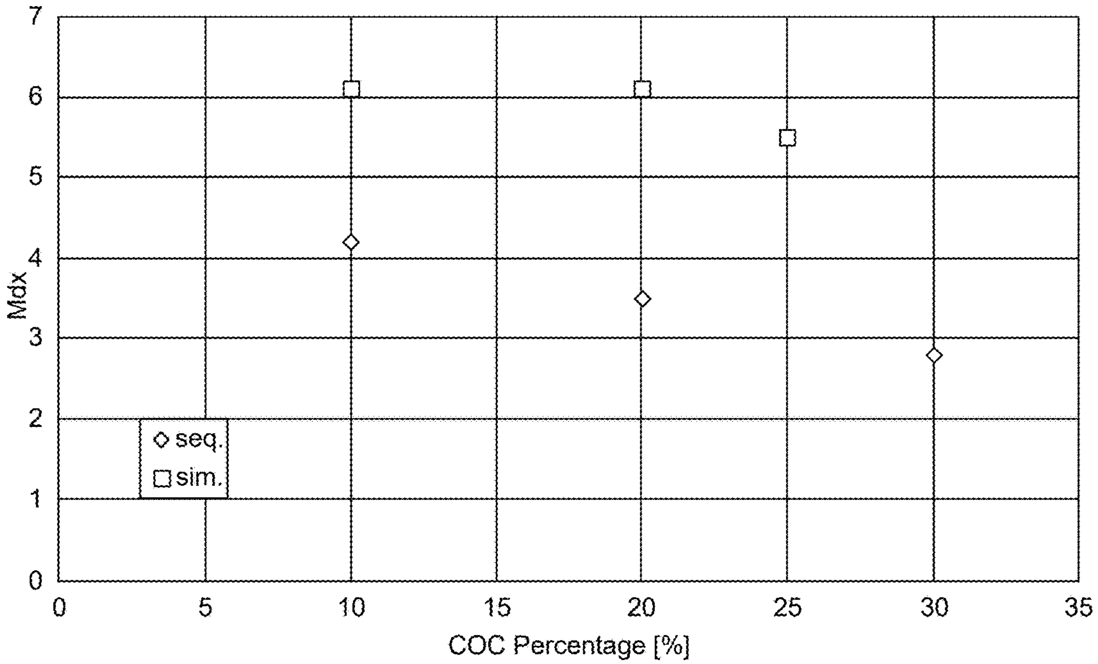
FIG. 3 shows the maximum possible stretching ratio in the longitudinal direction (MDx) for films with a film thickness of 3.8 μm, which only contain one cyclic olefin polymer, both for sequential stretching and also for simultaneous stretching.

COC cyclic olefin polymer, specifically cyclic olefin copolymer

MD longitudinal direction, running direction, machine direction

PP Polypropylene

TD transverse direction, perpendicular to the machine direction

Tg Glass transition temperature

Examples

Measuring Methods:

Film thicknesses: DIN 53370; Layer thicknesses: DIN EN ISO 3146; crystallite melting temperature, glass transition temperature and degree of crystallisation: ISO 11357-1, -2, -3 (DSC, heating speed 10 K/min); melt flow index: ISO 1133; heat shrinkage: DIN ISO 11501; surface roughness: DIN EN ISO 4287; dielectric strength: DIN EN 60243-2; loss factor and dielectric constants: DIN EN 60674-2 (VDE).

Materials:

Polypropylene: Borclean® HC300BF (crystallite melting temperature 164° C.; melt flow index (230° C./2.16 kg): 3.3 g/10 min); metallisable PP for dielectric films for capacitors; extremely high purity, ash content <20 ppm, content of metals: titanium <3 ppm, aluminium <3 ppm, chloride <3 ppm;

Cyclic Olefin Polymer 1 (COC1): Topas COC 6013 M07
copolymer made of norbornene and ethylene
glass transition temperature of 142° C.,
melt flow index (260° C., 2.16 kg) 13.26 g/10 min Cyclic Olefin Polymer 2 (COC2): Topas COC 6015 S04
copolymer made of norbornene and ethylene
glass transition temperature of 158° C.
melt flow index (260° C., 2.16 kg) 4.08 g/10 min Manufacture of the Films According to the Invention:

Polypropylene, cyclic olefin polymer 1 and cyclic olefin polymer 2 in the form of granulates are melted with the help of a twin screw extruder at 250 to 260° C. (batch dosing) and deposited on a cooling roll by means of a wide-slit nozzle. To sup-port the pressing of the film onto the cooling roll, a usual high-pressure air curtain was used. The temperature of the surface of the cooling roll is held at a temperature in the range of 90 to 95° C. A cooling bath as not used.

The films are fed into a simultaneous stretching machine (only in examples 1, 3, 4 and 5). The simultaneous stretching machine is divided into heat zones, in which the film is heated to the temperatures shown in Table 1. The films are evenly heated from above and below. The previously described first zone 22, second zone 24 and third zone 26 are divided into different heat zones in the following.

TABLE 1

| thermal profile during stretching (simultaneous; LI-SIM method) | | |
|---|---|---|
| Heat zone | Temperature [° C.] | Processing step |
| 1-2 | 170 | Preheating |
| 3 | 171-172 | Preheating |
| 4 | 172-173 | Stretching zone |
| 5 | 174 | Stretching zone |
| 6 | 168 | Annealing/Relaxation |
| 7 | 170-172 | Annealing/Relaxation |
| 8 | 172 | Annealing/Relaxation |
| 9 | 166-164 | Annealing/Relaxation |

In examples 1, 4 and 5 the film is stretched by means of simultaneous stretching in the longitudinal direction by a factor of 6.1, and in the transverse direction, by a factor of 9.9. The relaxation (tension removal) occurs in the longitudinal and in the transverse direction by an value of 10%. Therefore, the effective stretching ratio is 5.5 in the longitudinal direction and 9 in the transverse direction, and the surface stretching ratio is 50. In example 3, a stretching ratio of 5 in the longitudinal direction was used.

In example 2, sequential stretching was used. To this end, the film was first fed into a longitudinal stretching machine (MDO). In the longitudinal stretching machine, the film is guided over the rollers, which are heated and have different speeds, and thus stretch the film in the longitudinal direction. The rolls are at the temperatures shown in table 2.

TABLE 2

| (MDO): | | |
|---|---|---|
| Rollers | Temperature [° C.] | Processing step |
| 1 | 104 | Preheating |
| 2 | 114 | Preheating |
| 3 | 130 | Preheating |
| 4 | 134 | Preheating |
| 5 | 138 | Preheating |
| 6 | 140 | Preheating |
| 7 | 150 | Stretching zone |
| 8 | 150 | Stretching zone |
| 9 | 124 | Stretching zone |
| 10 | 124 | Stretching zone |
| 11 | 127 | Annealing |
| 12 | 127 | Annealing |

The film that has been stretched in the longitudinal direction is then stretched in the transverse direction. To do this, it is fed into a transverse stretching machine (TDO). Here, the film is once again preheated in a preheating zone (first zone 22), stretched in the stretching zone (second zone 24), and heat treated in a third zone 26 (so-called annealing), and relaxed in the transverse direction by 10%. In the different zones, the film is heated to the temperatures shown in Table 3. The films are evenly heated from above and below.

TABLE 3

| (TDO): | | |
|---|---|---|
| Zones | Temperature [° C.] | Processing step |
| 1 | 182 | Preheating |
| 2 | 180 | Preheating |

TABLE 3-continued

| (TDO): | | |
|---|---|---|
| Zones | Temperature [° C.] | Processing step |
| 3 | 178-176 | Preheating |
| 4 | 174-173 | Stretching zone |
| 5 | 172-171 | Stretching zone |
| 6 | 170 | Annealing |
| 7 | 172 | Annealing |
| 8 | 172 | Annealing |
| 9 | 166-162 | Annealing |

In order to be able to ensure a stable manufacture of films, breaks had to be avoided. To this end, a reduction of the surface stretching ratio by reducing the stretching ratio in the longitudinal direction was necessary in examples 2 and 3. In example 2, a stretching ratio of 3.7 was used in the longitudinal direction.

2 films according to the invention were produced, and 3 comparative tests were carried out. The data relating to the films can be found in table 4, below.

TABLE 4

| Composition and properties | | | | | |
|---|---|---|---|---|---|
| | Example | | | | |
| | 1* | 2* | 3* | 4 | 5 |
| Polypropylene content | 80 | 80 | 75 | 80 | 80 |
| COC 1 content | 20 | 20 | 25 | 16.8 | 10 |
| COC 2 content | 0 | 0 | 0 | 3.2 | 10 |
| Tg [° C.] | 142 | 142 | 142 | 145** | 150** |
| Kind of stretching*** | sim | seq | sim | sim | sim |
| Surface stretching ratio | 50 | 34 | 45 | 50 | 50 |
| Final film thickness [µm] | 3.8 | 3.8 | 3.8 | 3.8 | 3.8 |
| Roughness (MD) Ra [µm] | 0.09 | 0.06 | 0.04 | 0.06 | 0.09 |
| Roughness (MD) Rmax [µm] | 0.9 | 0.05 | 0.4 | 0.7 | 0.7 |
| Roughness (TD) Ra [µm] | 0.09 | 0.07 | 0.05 | 0.06 | 0.09 |
| Roughness (TD) Rmax [µm] | 0.9 | 0.9 | 0.5 | 0.6 | 0.9 |
| Breakdown voltage [V] | 560 | 520 | 550 | 560 | 600 |
| Shrinkage (120° C./5 min) | | | | | |
| MD [%] | 1.7 | 1.0 | 1.3 | 1.0 | 1.0 |
| TD [%] | 0 | 0 | 0 | 0 | 0 |
| Shrinkage (130° C./5 min) | | | | | |
| MD | 2.6 | 2.0 | 2.1 | 2.0 | 1.8 |
| TD [%] | 0 | 0 | 0 | 0 | 0 |
| Shrinkage (140° C./5 min) | | | | | |
| MD [%] | 4.7 | 3.2 | 3.7 | 3.8 | 4.4 |
| TD [ %] | 0.3 | 0.2 | 0.3 | 0 | 0 |

*Comparative tests

**Weighted arithmetic mean of the Tg of COC1 and COC2

***sim = simultaneous; seq = sequential

In example 1 and example 3, according to the prior art (WO 2018/197034 A1), only one cyclic olefin polymer was used and the amount of the polymer in the polymer blend was increased in order to increase the thermal resistance. It is shown that, when increasing the proportion of cyclic olefin polymer by only 5 percent by weight, a reduction of the surface stretching ratio becomes necessary for simultaneous stretching in order to ensure a stable production (adequate running stability). Only in this way is it possible for long sheets of film to be produced without films tearing. In particular, the stretching in the machine direction must be reduced. As can be seen from WO 2018/197034 A1, the film thickness can also be increased, instead of reducing the stretching ratio, in order to prevent tearing of the film during production. Large film thicknesses are, however, a disadvantage for films for capacitors, as with thick films, the capacitors are a larger volume at the same capacity. Since in many applications, including in car construction, the installation space is severely limited, this is a disadvantage. In examples 4 and 5 according to the invention, a reduction of the surface stretching ratio is not necessary for the same film thickness. Additionally, example 5 offers a breakdown voltage that is increased by about 10%.

As Table 4 shows, the values for the shrinkage in the transverse direction at 140° C. in the examples according to the invention are also slightly improved compared to the examples not according to the invention.

In order to investigate the effects of the present invention on the electrical properties of the films, the films obtained were subjected to a typical metallisation for capacitor films (profile metallisation for DC-Link applications) and capacitors were manufactured from each metallised film. The capacitors were exposed to different test voltages at 125° C. and at 135° C. in a heating chamber for 3000 hours. From this, different field strengths arise, which are indicated in the table. The field strength is the quotient of voltage in [V] and the film thickness [µm] (here, 3.8 µm). If a short circuit was measured, then the capacitor was counted as a failure. Capacitance drift (dC/C) and change in the loss factor of the capacitors were studied in defined time intervals (1000 hours/2000 hours/3000 hours). When this data deviated considerably from the base-line values, these capacitors were also counted as failures. Table 5 shows the results of the experiments. Examples 1 to 3 are comparative tests.

TABLE 5

| electrical properties | | | | | |
|---|---|---|---|---|---|
| | 125° C. | | 135° C. | | |
| Example | 200 V/µm* | 250 V/µm* | 140 V/µm* | 180 V/µm* | 200 V/µm* |
| 1 | — | Failure | Failure | Failure | — |
| 2 | Failure | | — | | |
| 3 | — | Failure | — | — | Failure |
| 4 | OK | | OK | — | Failure |
| 5 | OK | | OK | | |

*Field strength

OK = The capacitors were still within all limit values after 3000 hours

Failure = Failure through short circuiting or due to high capacitance drift or to high loss factor — not determined As can be seen from Table 5, the films according to the invention have significantly superior electrical properties at high temperatures. The films according to the invention of examples 4 and 5 pass the tests completely without failure at a temperature of 125° C. and field strengths of 200V/µm and 250V/µm. The films from comparative tests 1 to 3 all fail at 250V/µm, and only the film from comparative test 1 passes the test at 200V/µm. The film from comparative test 3 was not measured at 200V/µm but is unusable at 125° C. and 250V/µm due to short circuiting.

At 135° C., the films from the comparative tests pass none of the tests conducted. The film from example 5 passes the tests at all field strengths and the film from example 4 still passes at a field strength of 140V/µm. This film first fails at 200V/µm due to too high a capacitance drift. The films according to the invention therefore have significantly better electrical properties at high temperatures. In contrast to the capacitors according to the prior art, these are therefore suitable for high-temperature applications in the automotive industry.

The invention claimed is:

1. Biaxially orientated film containing a) at least 2 cyclic olefin polymers and b) at least one semi-crystalline alpha-olefin polymer wherein the sum of the percentages of all the cyclic olefin polymers in the film is in the range of 1 to 25 percent by weight and all the cyclic olefin polymers contained in the film have a glass transition temperature in the range of 120 to 180° C. and the film contains at least a first cyclic olefin polymer and a second cyclic olefin polymer, wherein the second cyclic olefin polymer has a higher glass transition temperature than the first cyclic olefin polymer and wherein the sum of the percentages of all the semi-crystalline alpha-olefin polymers in the film is in the range of 75 to 99 percent by weight and all the semi-crystalline alpha-olefin polymers contained in the film have a crystallite melting temperature in the range of 150 to 170° C. and wherein the weighted arithmetic mean of the glass transition temperatures of all the cyclic olefin polymers contained in the film is smaller than or equal to the weighted arithmetic mean of the crystallite melting temperatures of all the semi-crystalline alpha-olefin polymers contained in the film and wherein all quantities are based on the overall mass of the film.

2. Film according to claim 1, wherein the film only contains one semi-crystalline alpha-olefin polymer and the weighted arithmetic mean of the glass transition temperatures of all the cyclic olefin polymers contained in the film is smaller than or equal to the crystallite melting temperatures of the semi-crystalline alpha-olefin polymer.

3. Film according to claim 1, wherein the film contains only one semi-crystalline alpha-olefin polymer, which is polypropylene.

4. Film according to claim 1, wherein all cyclic olefin polymers are copolymers, which contain norbornene and ethylene as monomers.

5. Film according to claim 1, wherein the sum of the percentages of all the cyclic olefin polymers in the film is in the range of 10 to 25 percent by weight and the sum of the percentages of all the semi-crystalline alpha-olefin polymers in the film is in the range of 75 to 90 percent by weight.

6. Film according to claim 1, wherein the second cyclic olefin polymer has a glass transition temperature at least 3° C. higher than that of the first cyclic olefin polymer.

7. Film according to claim 1, wherein the film contains only one semi-crystalline alpha-olefin polymer, which is polypropylene, and the film contains no further cyclic olefin polymers besides the first and the second cyclic olefin polymer and both the first and also the second cyclic olefin polymer contain norbornene and ethylene as monomers.

8. Film according to claim 1, wherein the first cyclic olefin polymer and the second cyclic olefin polymer are each contained in the film in a percentage in the range of 5 to 15 percent by weight.

9. Multi-layer film comprising at least one layer that consists of a film according to claim 1.

10. Film according to claim 1, wherein the film has a heat shrinkage in the longitudinal direction of at most 5%, and in the transverse direction of at most 0.5%, measured according to ISO 11501 at 130° C. after 5 minutes.

11. Film according to claim 1, wherein the film has a surface roughness $R_a$ in the range of 0.02 to 0.2 μm, in the longitudinal and in the transverse direction, measured according to DIN EN ISO 4287.

12. Film according to claim 1, wherein the film has a thickness in the range of 2 μm to 10 μm.

13. Film according to claim 1, wherein the film is metallised on one or both sides.

14. Capacitor, wherein it comprises a film according to claim 1.

15. Method for manufacturing a film according to claim 1, wherein the film is manufactured according to a method comprising the following steps:

production of a film containing at least two cyclic olefin polymers and at least one semi-crystalline alpha-olefin polymer, stretching of the film in the longitudinal direction (MD) and in the transverse direction (TD), in order to obtain a biaxially stretched film, and coiling of the biaxially stretched film.

16. Method according to claim 15, wherein the surface stretching ratio of the biaxially stretched film is at least 40.

17. Method according to claim 15, wherein the stretching in the longitudinal direction and in the transverse direction occurs simultaneously or the stretching initially occurs in the longitudinal direction and the film that has been stretched in the longitudinal direction is then stretched in the transverse direction.

18. Method according to claim 15, characterised by one or more of the following further steps:

heat treatment of the biaxially stretched film, relaxation of the biaxially stretched film, whereby the surface stretching ratio is deliberately reduced.

19. Method according to claim 15, wherein the method comprises the following step:

production by extrusion of the film containing at least two cyclic olefin polymers and at least one semi-crystalline alpha-olefin polymer.

* * * * *